United States Patent [19]
Sadan

[11] Patent Number: 5,447,543
[45] Date of Patent: Sep. 5, 1995

[54] PROCESS FOR CRYSTALLIZING INORGANIC SALTS

[75] Inventor: Abraham Sadan, Park City, Utah

[73] Assignee: Exportadora De Sal, S.A. De C.V., Guerrero Negro, Mexico

[21] Appl. No.: 896,526

[22] Filed: Jun. 9, 1992

[30] Foreign Application Priority Data

Jun. 10, 1991 [MX] Mexico ............................ 26177

[51] Int. Cl.⁶ .................... B01D 9/00; C01D 1/30; C01F 5/34
[52] U.S. Cl. ............................. 23/300; 23/295 S; 23/302 T; 23/303; 23/304
[58] Field of Search .............. 23/303, 302 T, 298, 23/300, 295 S, 364

[56] References Cited

U.S. PATENT DOCUMENTS

| | | | |
|---|---|---|---|
| 1,873,251 | 8/1932 | Allen et al. | 23/303 |
| 2,753,242 | 7/1956 | Davis | 23/303 |
| 3,656,892 | 4/1972 | Bourne et al. | 423/206.5 |
| 3,772,207 | 11/1973 | Neitzel et al. | 23/303 |

OTHER PUBLICATIONS

Ehret, *Smith's, College Chemistry*, 6th Ed. 1935 No month available pp. 274–276, 506–507.
Rozycki, J., "Economics of Recompression Salt Evaporation" Fourth International Symposium of Salt, The Northern Ohio Geological Society, pp. 425–431 (1973) No month available.
Pavlik, A. et al., "Description and Operation of a High Capacity Evaporator for the Production of a Very Pure Chemical Grade Salt", Fifth International Symposium on Salt, vol. II., pp. 335–339. (1980) No month available.
Karoly, J. et al., "Compression Evaporators", Sixth International Symposium on Salt, vol. II, Salt Institute, pp. 439–454 (1983) No month available.
Bella, F., "Energy Conservation Salt Evaporators", Sixth International Symposium on Salt, vol. II, Salt Institute pp. 481–494 (1983) No month available.
Bauschlicher, H. et al., "Production of Vacuum Salt Based on Sea Water as a Raw Material", Sixth International Symposium on Salt, vol. II, Salt Institute, pp. 495–497 (1983) No month available.
Kawahara, T. et al., "Concentration of Seawater by New Electrodialysis Process", Sixth International Symposium on Salt, vol. II, Salt Institute, pp. 499–513 (1983) No month available.
Kawate, H. et al. "Energy Savings in Salt Manufacture by Ion Exchange Membrane Electrodialysis", Sixth International Symposium on Salt, vol. II, Salt Institute, pp. 471–479 (1983) No month available.
Mellor, *Comprehensive Treatise on Inorganic and Theoretical Chemistry*, vol. II, p. 525 (1927) No month available.
Kirk-Othomer, *Encyclopedia of Chemical Technology*, vol. 7, pp. 243, 261–262 (3rd Ed. 1979) No month available.

*Primary Examiner*—Gary P. Straub
*Attorney, Agent, or Firm*—Pennie & Edmonds

[57] ABSTRACT

The present invention is an improved method for crystallizing inorganic salts. The inorganic salts that are suitable for this process are characterized by the fact that they form isothermic or polythermic concave solubility curves. Each concave solubility curve represents saturated concentrations of the salt that is desired to be purified versus either concentrations of a second, different inorganic salt or versus temperature.

13 Claims, 10 Drawing Sheets

PROCESS FOR CRYSTALLIZING INORGANIC SALTS

TECHNICAL FIELD

The present invention relates to an improved method for crystallizing inorganic salts which form saturated solutions having polythermic or isothermic concave solubility curves from crude mixtures including said salts in order to separate the desired salt from other salts and/or from impurities present within the mixture.

BACKGROUND ART

Inorganic salts have many uses in industry. Sodium chloride (NaCl), for example, is used for preserving and seasoning food, as well as in metallurgy, soap manufacturing, medicine and for a host of other uses. Potassium chloride (KCl) is used as a fertilizer, a source of potassium salts, in pharmaceutical preparations, in photography, spectroscopy, as a food additive, salt substitute, plant nutrient, laboratory reagent, and in buffer solutions. Magnesium sulfate ($MgSO_4.H_2O$) is used in ceramics, textiles, fireproofing and as a catalyst. Magnesium nitrate hexahydrate ($Mg(NO_3)_26H_2$) is used as a fertilizer and defoliant. Sodium borate ($Na_2B_4O_7$) (in its various hydrated forms) is used as an herbicide and in the manufacture of glass, enamels and other ceramic products.

Salts such as those mentioned above, as well as many other inorganic salts, exist in nature, e.g., in sea water or as a natural ore, in forms which are substantially impure, i.e., in a "crude" form. As is well understood by those who are familiar with these materials and their uses, the various applications described above typically involve the use of salts which have been "purified", i.e., separated from other salts or contaminants present in the mix, to some degree.

There are thus a variety of methods known in the art for isolating, i.e., purifying, inorganic salts by separating desired salts from a mixture of such salts or by removing the impurities therefrom. Such methods typically require the use of extensive quantities of energy to evaporate large amounts of water, however, in order to recover the desired salt in a purified form.

For example, inorganic salts have for a number of years been obtained in warm climates by crystallization from sea water. One method commonly utilized in carrying out this crystallization is solar evaporation. The solar evaporation technique, however, produces only a "crude" product comprising a variety of inorganic salts and impurities. This crude salt product must then, as is well known, be dissolved and recrystallized in order to obtain a "purified" salt using thermal energy for vacuum evaporation or vacuum cooling.

Alternatively, in locations where the climate is not sufficiently warm to render the above-described solar evaporation technique cost effective, sea water is evaporated using solar energy only up to a point where the solution remaining is saturated with NaCl, although other salts are typically present as well in varying concentrations. Thereafter this solution is processed by vacuum crystallization to evaporate the water from the solution and thus produce a purified salt product.

In colder climates, sea water is often desalinated by freezing. The first crop of ice which separates is removed following which the remaining brine is further concentrated by again allowing it to freeze. After removing the second crop of ice, the brine is still further concentrated by heat evaporation. Eventually the salt separates from the liquid as the liquid is evaporated. See, e.g., Mellor, *Comprehensive Treatise on Inorganic and Theoretical Chemistry*, Vol. II, p. 525 (1949). Although the energy required to crystallize ice is about one-seventh that necessary for evaporation of water, generating cooling energy is usually more costly than generating heating energy and thus the ice-brine separation is typically too expensive for use in countries with relatively warm climates. Kirk-Othomer, *Encyclopedia of Chemical Technology*, Vol. 7, p. 243 (3rd. ed. 1979).

An additional prior art method of crystallization involves subjecting a salt solution (often sea water) to a process known as multi-stage flash distillation ("MSF"). This process, which is well known to those skilled in the art, involves the rapid conversion of an appreciable proportion of a liquid to a vapor in such a manner that the vapor thus produced is in equilibrium with the remaining liquid. The remaining liquid, containing the salt, is then distilled until the solution is at its saturation point, i.e., known in the art as its "preconcentration stage". This preconcentrated seawater solution is then further concentrated and subsequently brought to a salt pond for solar evaporation. In the alternative, the liquid may be evaporated by vacuum instead of in a salt pond.

Another method for purifying mixtures of inorganic salts is known as electrodialysis. This method relies upon a dialysis process which occurs at a rate which is enhanced by the application of an electric potential across the dialysis membrane. This method, which is also well known in the art, is comprised of two steps, the first of which involves electrodialysis of sea water with the use of an ionexchange membrane to selectively obtain brine therefrom. The second step involves the extraction of salt crystals from the brine by multi-effect evaporation and crystallization. The required energy is provided by electricity in the first step and by heat in the second step.

The processes described above are generally described in Bauschlicher et al., "Production of Vacuum Salt Based on Seawater as Raw Material," *Sixth International Symposium on Salt*, II: p. 495–497 (1983). Electrodialysis, in particular, is also described in Kawahara et al., "Concentration of Sea Water by New Electrodialysis Process," *Sixth International Symposium on Salt* II: p. 499–513 (1983), as well as in Kawate et al., "Energy Savings in Salt Manufacture by Ion Exchange Membrane Electrodialysis", *Sixth International Symposium on Salt*, II: p. 471–479 (1983).

The processes described above, however, all require the use of sophisticated apparatus and/or large amounts of energy for evaporating the solutions to obtain the preferred salts. For example, the literature concerning these processes describes the use of high capacity evaporators or multi-effect evaporators (e.g., quadruple effect evaporators) and mechanical recompression units to evaporate water. For a further explanation, see, e.g., Pavlik, et al., "Description and Operation of a High Capacity Evaporator for the Production of a Very Pure Chemical Grade Salt," *Fifth International Symposium on Salt,—The Northern Ohio Geological Society* 5:(2) p. 335–339.

Those working in this field have thus long felt the need for a process capable of obtaining purified inorganic salts which can be carried out without complicated equipment at a reduced (i.e., in contrast to the prior art) expenditure of energy and thus at a reduced cost.

SUMMARY OF THE INVENTION

The present invention thus provides an improved, cost-effective method of crystallizing certain inorganic salts, i.e., those salts which form saturated solutions having isothermic or polythermic concave solubility curves. The concave curves are formed when saturated concentrations of the inorganic salt are plotted versus either concentrations of another, different inorganic salt or plotted versus different temperatures, so as to separate a desired salt from a mixture of other salts in a solution and/or from other impurities.

One of ordinary skill in the art would recognize which organic salts are capable of forming a saturated solution having a concave solubility curve, as described above, without undue experimentation as the information necessary for this determination is available in a variety of reference texts.

The presently disclosed method is simple and cost-effective because it does not require evaporation of the solution water, thus eliminating the need for the costly and complex equipment used for this purpose in the prior art. In addition, the method of the invention provides salt products having a purity of USP or technical grade at a lower cost than was previously possible with the use of the prior art methods.

Furthermore, since in the present invention the salt is collected without the need for evaporating the liquid, the purified salt is more easily (i.e. in comparison to the prior art) separated from impurities present within the mixture since the impurities typically encountered in these processes remain in solution. In prior art processes such as those described above, the water must be evaporated in order to recover the dissolved salts. Thus in the prior art, some impurities will remain with the salt unless removed by costly means before evaporation.

Moreover, the present invention represents a further improvement over the prior art in that it also does not require mechanical energy to evaporate the water in the solution remaining after the purified salt is separated. In addition, the present invention does not require the use of expensive and/or complicated apparatus such as high capacity or multi-effect evaporators. Thus, the salt produced by the method of the present invention is approximately one-third cheaper per ton as compared with the salt produced according to the prior art methods described above.

A first embodiment of the present invention relates to a process which will be referred to herein as "isothermic crystallization." In the isothermic crystallization embodiment of the invention, the temperature of the solution is maintained within a substantially constant range.

Isothermic crystallization relies on the principal that, in a solution of two salts, where one salt has a higher solubility as compared to the other, the salt that has the lower solubility will precipitate first from the solution. Isothermic crystallization can only be accomplished, however, when the plot of saturated concentrations of the first salt vs. a range of concentrations of the second salt produces a concave solubility curve. One of ordinary skill in the art would be able to identify salt mixtures which would produce such curves without any undue experimentation, i.e., by plotting the saturated concentrations of the desired salt vs. concentrations of a second inorganic salt. For example, the solubility values of various inorganic salts can be readily obtained from commonly available reference works such as T. D'Ans, The Solution Equilibria of Oceanic Salts and W. F. Linke, Solubilities of Inorganic Compounds.

Curves of the type described above are produced, for example, with the following salt mixtures, which are provided for illustration only and which are not to be construed as limiting the invention in any matter, e.g., (1) saturated KCl in a solution of $CaCl_2$; (2) saturated NaCl in a solution of $CaCl_2$; and (3) saturated $MgSO_4 \cdot H_2O$ in a solution of $MgCl_2$.

In the isothermic crystallization process of the present invention, two solutions of inorganic salts are combined to form a mixture. The first solution which is saturated with respect to a first salt, i.e., the salt that is desired to be purified, may also optionally contain a quantity of a second, different inorganic salt. The second solution is also saturated with the first salt. In addition it must also contain some of the second, different inorganic salt, the quantity of which may be varied as desired. The mixture of the first and second solutions forms a third solution which is supersaturated with respect to the first salt, i.e., the salt that is sought to be purified. Because the third solution is supersaturated with the desired, i.e., first, salt, that salt will precipitate and may thereafter be collected. The remaining saturated solution can thereafter be re-used in carrying out the process of the invention.

The greater the concentration of the second inorganic salt, the greater the amount of the first salt that will be precipitated. Thus, in its most preferred embodiment, the concentrations of the two solutions should correspond to the two extremes of a given solubility curve.

Isothermic crystallization can, for example, be used in purifying KCl from a mixture of KCl and $MgCl_2$ (See FIG. 4 for the relevant solubility curve); or NaCl from a mixture of NaCl and $MgCl_2$ (See FIG. 5 for the relevant solubility curve).

A second embodiment of the invention is referred to herein as the "polythermic crystallization." In general, polythermic crystallization relies on the fact that a change in temperature of a salt solution will decrease a salt's solubility and thus cause the salt to precipitate from the solution. This precipitation occurs because the solubility of inorganic salts generally decrease as the temperature of the solution decreases. Polythermic crystallization can only occur, however, when a plot of the saturated concentration of the inorganic salt vs. temperature produces a concave solubility curve.

In the polythermic crystallization embodiment of the invention, two saturated solutions of the same salt having different temperatures are combined. The mixture thus produced will exist at a lower temperature with respect to one of the solutions due to the cooling caused by the lower temperature solution. Since the solubility of the desired salt vs. temperature lies on a concave solubility curve and mixing the two solutions will result in a supersaturated solution, the salt will thus precipitate from the solution. The salt can then be collected and the remaining solution can be re-used in practicing the invention. It is most preferred to choose two solutions which correspond to the two extremes of a given solubility curve, namely, relatively hot and cold solutions. This is because the greater the temperature difference between the two solutions, the more pure salt is precipitated.

DETAILED DESCRIPTION OF THE INVENTION

A. Isothermic Crystallization

To facilitate an understanding of the invention, the isothermic crystallization embodiment will be described using one of the examples set forth above in the Summary of the Invention; namely, the purification of NaCl using a solution of NaCl and $CaCl_2$. Clearly, though, as would be well understood by one of ordinary skill in the art, this embodiment would also work with other inorganic salts which meet the criteria defined herein. This explanation is therefore provided for purposes of illustration only and should therefore not be construed as limiting the invention in any manner.

Figure 1:
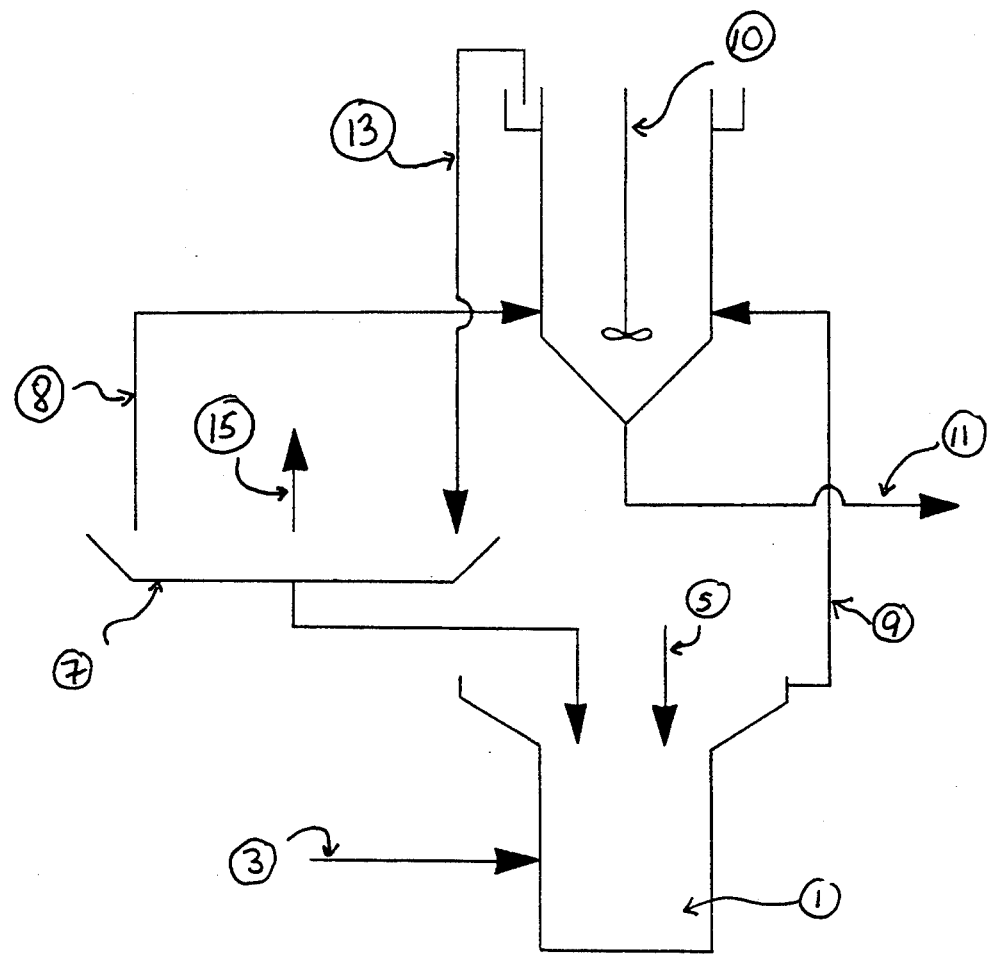
FIG. 1 is a flow diagram illustrating the isothermic crystallization embodiment of the invention.

Turning initially to FIG. 1, the isothermic embodiment of the invention is schematically illustrated. The process as shown in the subject figure includes the following steps as described below. The first step involves the preparation (1) of a first salt solution comprising a saturated solution of the salt that is to be purified (i.e., referred to herein as the "first solution".

On a production scale, this solution can be prepared, for example, in situ using a pond. In such circumstances, sea water is evaporated first to the preconcentration point, i.e., wherein the remaining solution is saturated with NaCl. The concentrated solution is then further evaporated to obtain relatively impure NaCl for industrial use. Upon further evaporation, when the magnesium chloride level increases the NaCl crystals produced by the process contain within them inclusions of magnesium chloride solution. These inclusions make the NaCl crystals unfit for many industrial uses, although it may be used for certain applications, such as the deicing of roadways and sidewalks. This further evaporation mentioned above is typically accomplished to a density of about 29° Bè. The relatively "impure" NaCl thus recovered is then dissolved with sea water (3) in a salt pond to form a saturated solution.

Alternatively, the NaCl salt for use in the invention may instead be obtained by purchasing an impure form of the salt and dissolving this "raw material" in water to form a saturated NaCl solution (5). The NaCl solution thus produced by either of the methods described above may optionally contain some $CaCl_2$.

The next step in the process involves the preparation (7) of a second salt solution (referred to herein as the "second solution". This solution comprises a saturated amount of NaCl and will contain an amount of $CaCl_2$. The $CaCl_2$ solution is prepared by dissolving relatively impure $CaCl_2$ crystals in water. In the preferred embodiment, the second solution will contain a large amount of $CaCl_2$.

In this case, the second salt solution can not be prepared in situ as described above with regard to the NaCl solution. The solubilization of the "raw," i.e., impure $CaCl_2$ must take place in fresh water because $CaCl_2$ will react with sea water to form $CaSO_4$.

Figure 2:
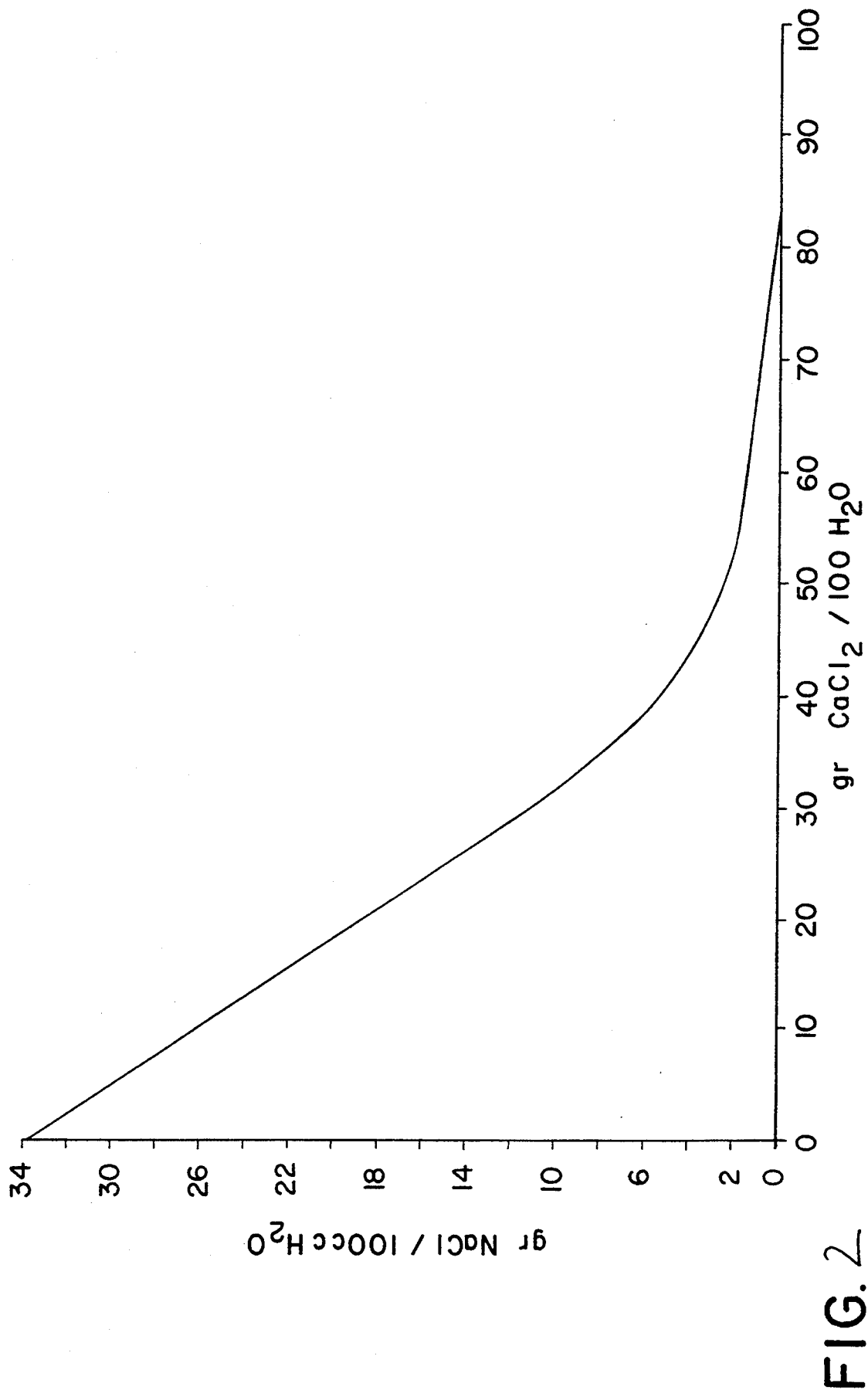
FIG. 2 is a solubility curve of saturated NaCl vs. $CaCl_2$.

Further with regard to the process of the invention, the concentration of the first and the second solutions is derived from a solubility curve of saturated NaCl vs. $CaCl_2$ at 25° C. as shown in FIG. 2. One of ordinary skill in the art would be familiar with these calculations.

Each point of the subject curve represents a solution which is concentrated with NaCl. At the highest point on the curve with respect to the ordinate axis, the concentration of $CaCl_2$ is at a minimum. At the highest point on the curve with respect to the abscissa, the solution will contain a maximum concentration of $CaCl_2$ and thus be saturated with both NaCl and $CaCl_2$. For any two points chosen from the curve, one can thus determine the concentration of the two solutions. Furthermore, the further apart the two points are on the curve, the more NaCl will be recovered. Thus, the more saturated the second solution is with $CaCl_2$, the more NaCl can be recovered.

Returning now to FIG. 1, after the first and second salt solutions are prepared, they are combined (8) and (9) to form a third, i.e., mixed solution (10). The solutions may be combined in any conventional reactor vessel, although a preferred method is to mix the two solutions in an atmospheric crystallizer. By crystallizing in the preferred manner, the size of the resulting crystals can be controlled by controlling the rate of crystallization within the crystallizer to provide products of different sizes for various commercial applications.

When the first and second solutions are combined, the resultant third solution can be illustrated on the solubility curve as a straight line connecting the two points on the curve which correspond to the two initial solution concentrations. This straight line represents a supersaturated solution of NaCl. Within the mixed, i.e., third solution, the salt which has the higher solubility, namely $CaCl_2$, will cause the salt having the lower solubility, namely NaCl, to precipitate out (11) of the solution. This precipitation of NaCl represents the transition from the straight line of the curve of the supersaturated solution to the saturated solution. The precipitate (11) is thereafter filtered and recovered and comprises substantially pure NaCl of USP grade.

The solution which is no longer supersaturated is transported to solar evaporation ponds (13). As the mixed solution evaporates (15), it becomes more concentrated with $CaCl_2$, thus allowing for the constant generation of the second solution. This solution will always be saturated with NaCl.

With further evaporation NaCl is further precipitated and directed to a dissolution tank i.e., as similarly shown in (5) in FIG. 1, or in the case of in situ preparation, to a salt pond, Mixing this precipitate with additional impure NaCl will allow for the continuous production of first solution.

A preferred method is to have multiple ponds positioned in constant use. For example, two ponds can be used to concentrate the mixed solution to the $CaCl_2$ solution and to precipitate NaCl, and one pond can be used to collect the NaCl. It can be readily seen that the higher the concentration of $CaCl_2$ in the second solution (the $CaCl_2$ solution), the more pure NaCl is recoverable.

The isothermic crystallization process described generally above is described in substantially greater detail below.

NaCl is saturated in fresh water at a temperature of 25° C. The saturated solution thus created ("A") contains about 34 gr. NaCl per 100 gr. $H_2O$. Separately, another solution ("B") is created, containing about 68 gr. of $CaCl_2$ per 100 gr. $H_2O$ and 1 gr. NaCl per 100 gr. of $H_2O$. The $CaCl_2$ is originally obtained from the solar evaporation of an impure $CaCl_2$ solution. Subsequently, 1 Kg of solution A is mixed with 1.254 Kg of solution B to make 2.254 Kg of a slurry, i.e., a mixture of salt solutions ("A&B"). C is supersaturated and contains 17.52 gr. of NaCl and 34 gr. of $CaCl_2$ per 100 gr. $H_2O$. As can be seen from FIG. 2, the concentration of NaCl when the concentration of $CaCl_2$ at this temperature is about 8.5 gr. per 100 gr. $H_2O$. Therefore, about 9.02 gr. of NaCl will precipitate out per 100 gr. of $H_2O$ entering the reaction mixture. The following table represents the material balance of the starting material and the material recovered from the above example.

| MATERIAL BALANCE OF ISOTHERMIC CRYSTALLIZATION PROCESS OF NaCl v. $CaCl_2$ | | | | |
|---|---|---|---|---|
| | NaCl (g) | $CaCl_2$ (g) | $H_2O$ (g) | Total (g) |
| Solution A | 254.00 | — | 746 | 1,000.00 |
| Solution B | 7.46 | 507 | 746 | 1,260.46 |
| Solution A & B | 261.46 | 507 | 1,492 | 2,260.46 |
| Actual Capacity | 126.82 | 507 | 1,492 | 2,125.82 |
| NaCl Crystallization | 134.64 | — | — | 134.64 |

Figure 3:
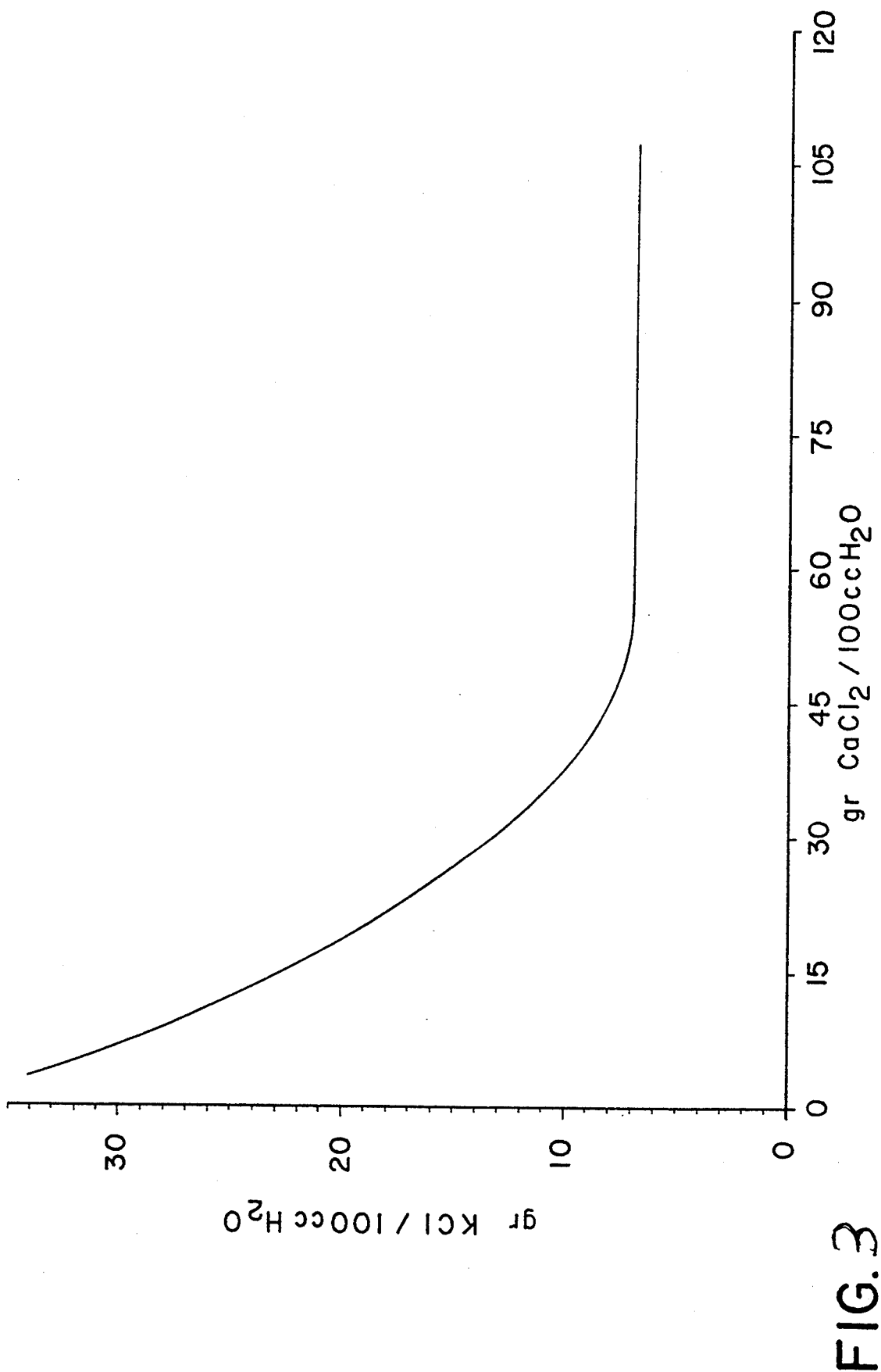
FIG. 3 is a solubility curve of saturated KCl vs. $CaCl_2$.
Figure 4:
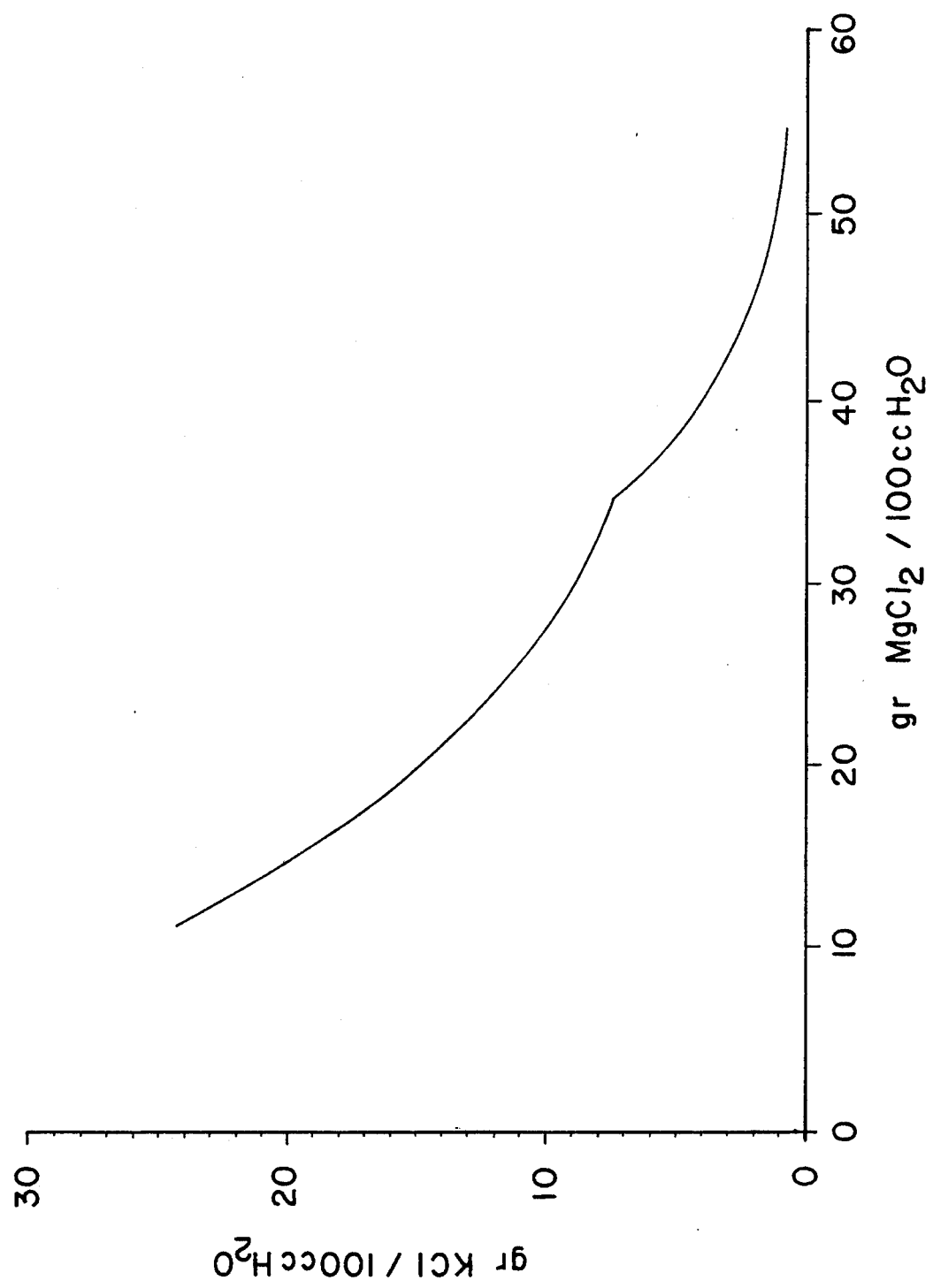
FIG. 4 is a solubility curve of saturated KCl vs. $MgCl_2$.
Figure 5:
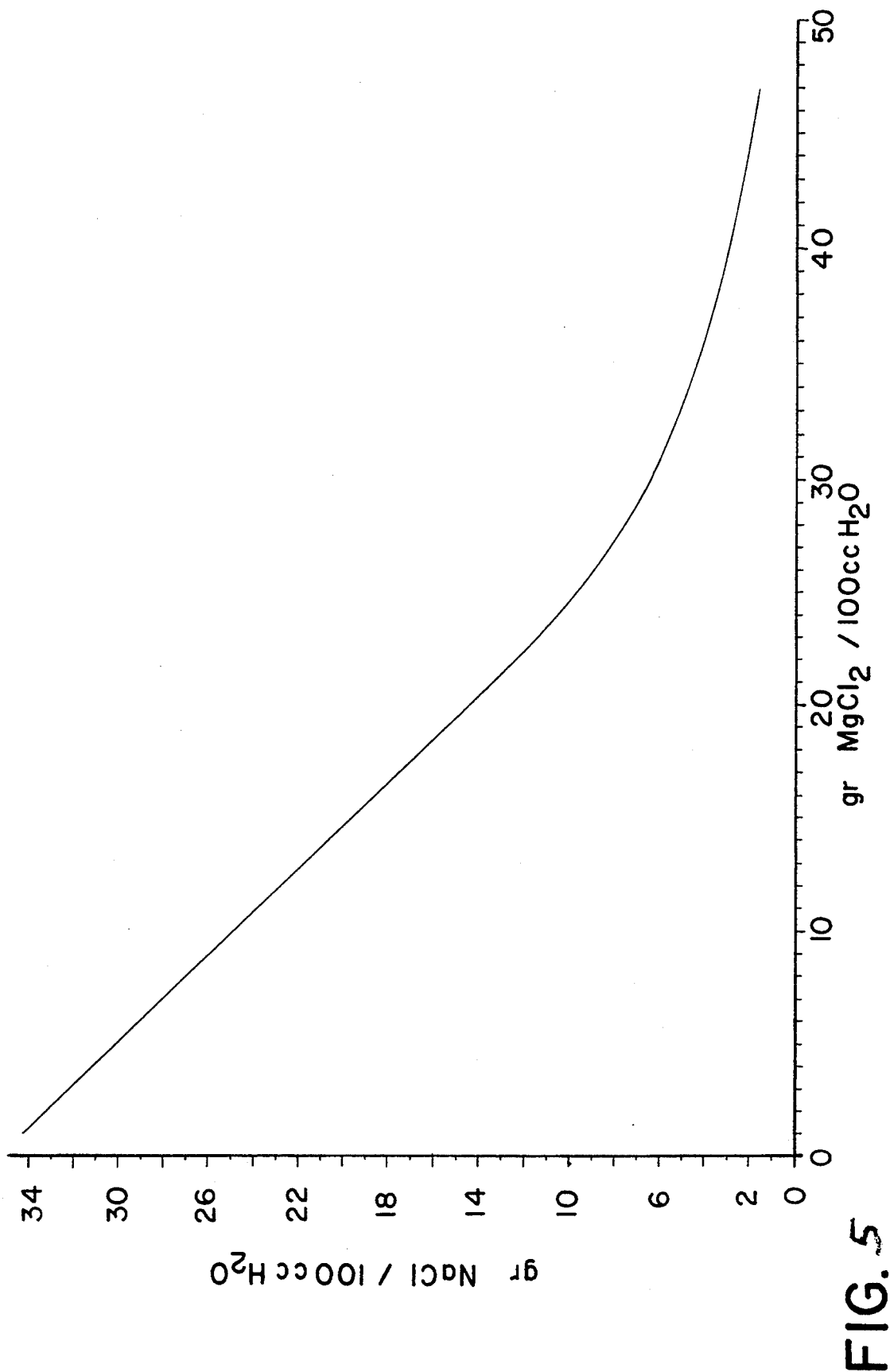
FIG. 5 is a solubility curve of saturated NaCl vs. $MgCl_2$.
Figure 6:
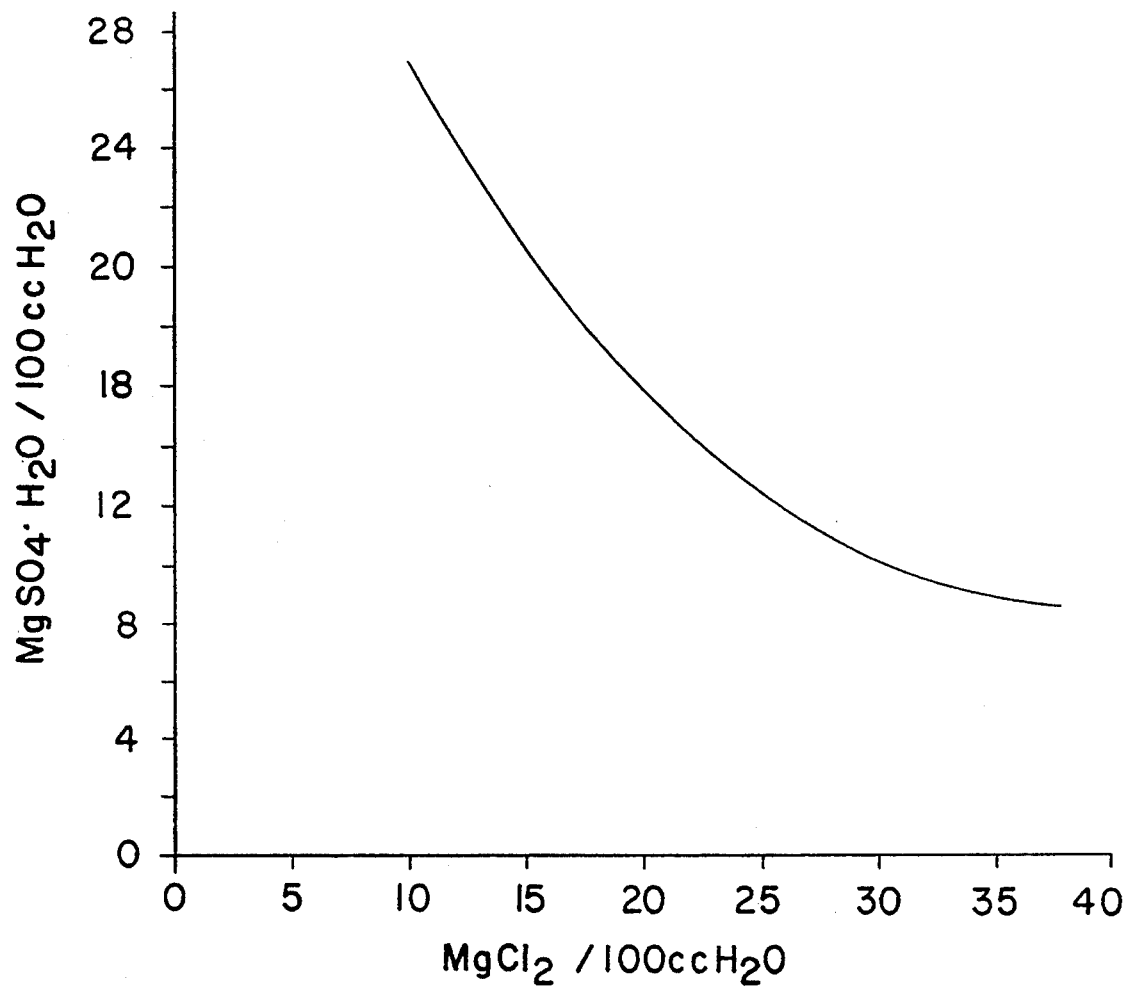
FIG. 6 is a solubility curve of saturated $MgSO_4.H_2O$ vs. $MgCl_2$.

In an additional example of the isothermic crystallization embodiment of the invention, a 1 Kg solution of 32 gr. KCl and 5 gr. $CaCl_2$ per 100 gr. of $H_2O$ was mixed with a 1 Kg solution of 90 gr. $CaCl_2$ and 7 gr. KCl per 100 gr. $H_2O$. The solutions were gradually introduced to an atmospheric crystallizer to be mixed for about more than two hours. About 65% KCl was recovered from the process corresponding to about 150 gr. of about 99.90% pure KCl containing a crystal size range of 30 to 60 mesh. (see FIG. 3 for the solubility curve).

B. Polythermic Crystallization

By way of illustration only and as an aid to understanding the invention, the polythermic crystallization embodiment of the invention will be described using sodium borate as a non-limiting example. Clearly though, as would be well understood by one of ordinary skill in the art, this embodiment would also work with other inorganic salts which meet the criteria defined herein.

Figure 7:
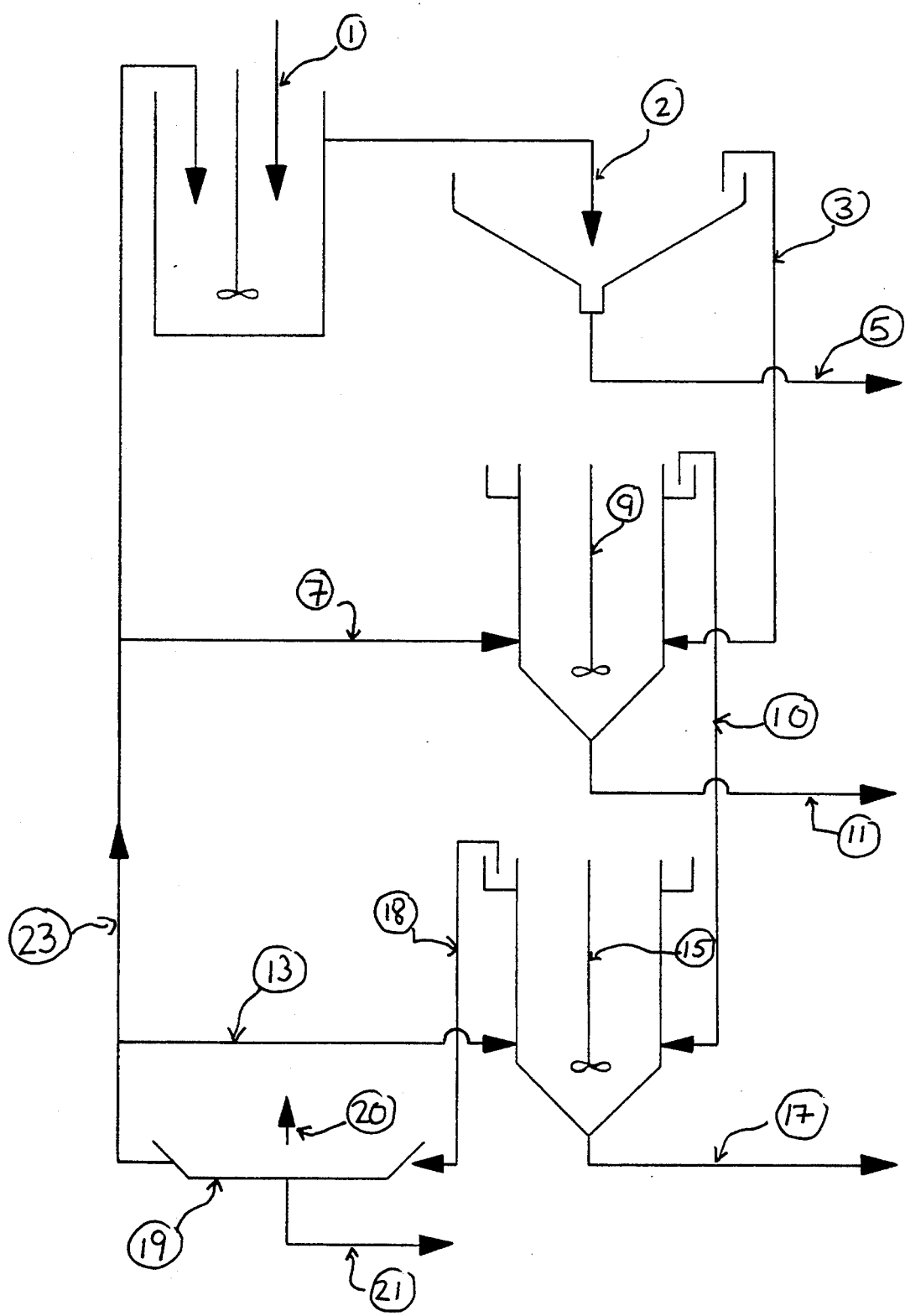
FIG. 7 is a flow diagram of illustrating the polythermic crystallization embodiment of the invention.

Turning to FIG. 7, tincal ore of low purity containing sodium borate and insolubles may be leached at 100° C. (1) to separate the tincalconite from other insolubles that may be present in the ore (2). The insolubles are separated and removed from the sodium borate (5). Thus, a first saturated solution of sodium borate is prepared ("A") (3) by tincal ore dissolution in $H_2O$ (1) to the point of saturation.

A second saturated solution of sodium borate ("B") is prepared (7) at a lower temperature of 10° C. As in the case of the isothermic crystallization embodiment of the invention, the solubility curve of the salt is used to determine the concentrations of the two solutions as well as the necessary temperature of the corresponding solutions.

It is also important to note that tincalconite and borax are different hydrated forms of the same inorganic salt. Thus if the overall temperature of the resulting mixed solution is above 60° C., tincalconite will be precipitated, if it is below 60° C., borax will be precipitated.

The first solution is then combined (9) with the second solution to form a mixture, preferably in an atmospheric crystallizer. Combining the two saturated solutions will thus create a supersaturated solution. At the same time, the mixing of the two solutions will result in a mixed solution having a lower temperature. Thus, the resultant supersaturated solution will not be able to hold all of the salt dissolved therein, resulting in the precipitation of a pure salt (11). Once the pure sodium borate precipitates from the mixed solution, the salt can be separated from the solution using a cyclone and a centrifuge. This salt is subsequently dried and packed.

The remaining solution (10) can, if desired, be mixed with more solution B at 10° C. (13) to form a new mixed solution (15). More sodium borate will precipitate, be removed, and collected (17). The remaining solution can be transported (18) to an evaporation pond (19). As the water evaporates more pure sodium borate is precipitated and harvested (21). The remaining solution is used to constantly generate new solution B which can also be used in the leaching process described above (23). The preferred method is to evaporate this solution and then cool it in an open pond at night. This embodiment of the invention is described below in greater detail below.

Figure 8:
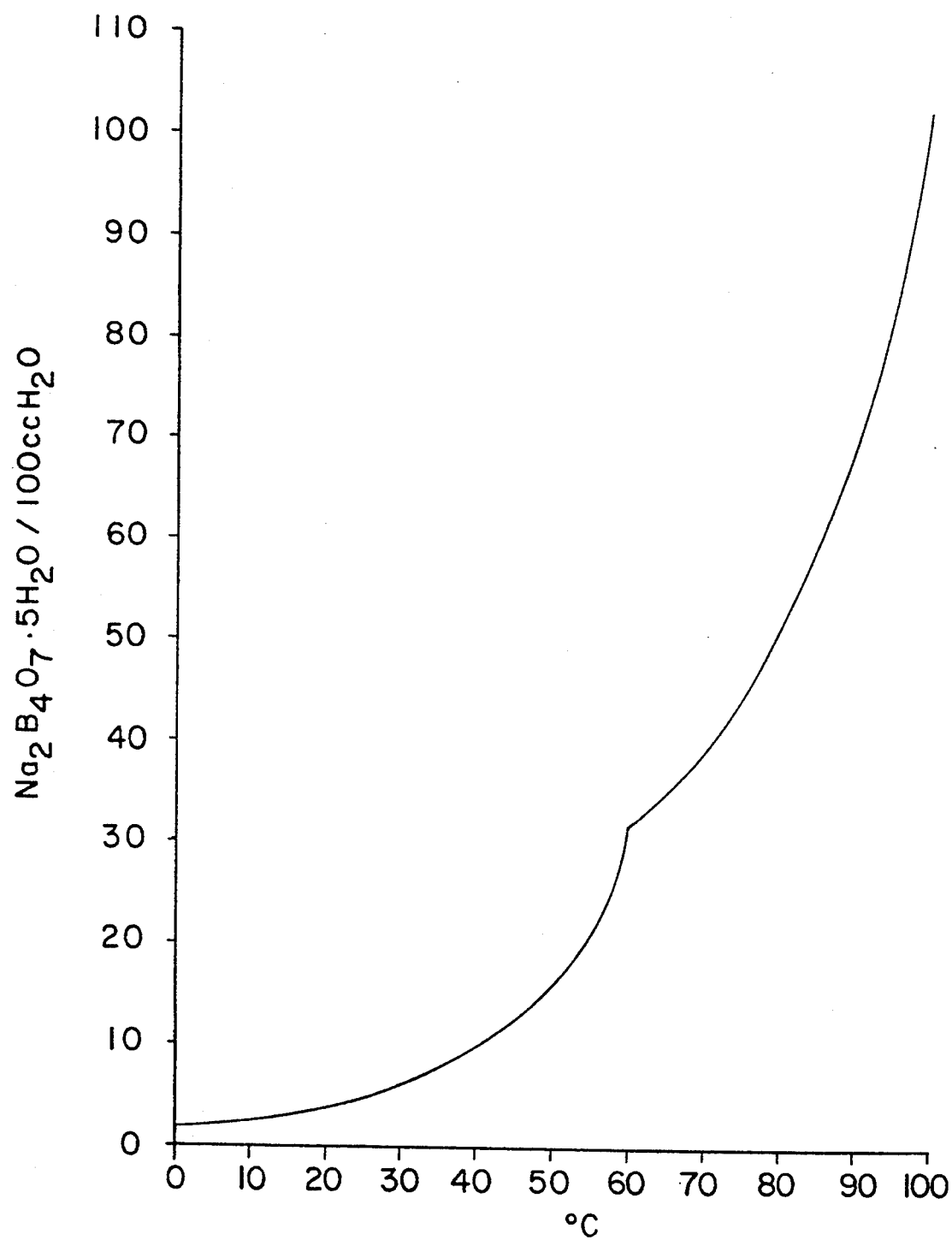
FIG. 8 is a solubility curve of saturated $Na_2B_4O_7.5H_2O$ as a function of temperature.
Figure 9:
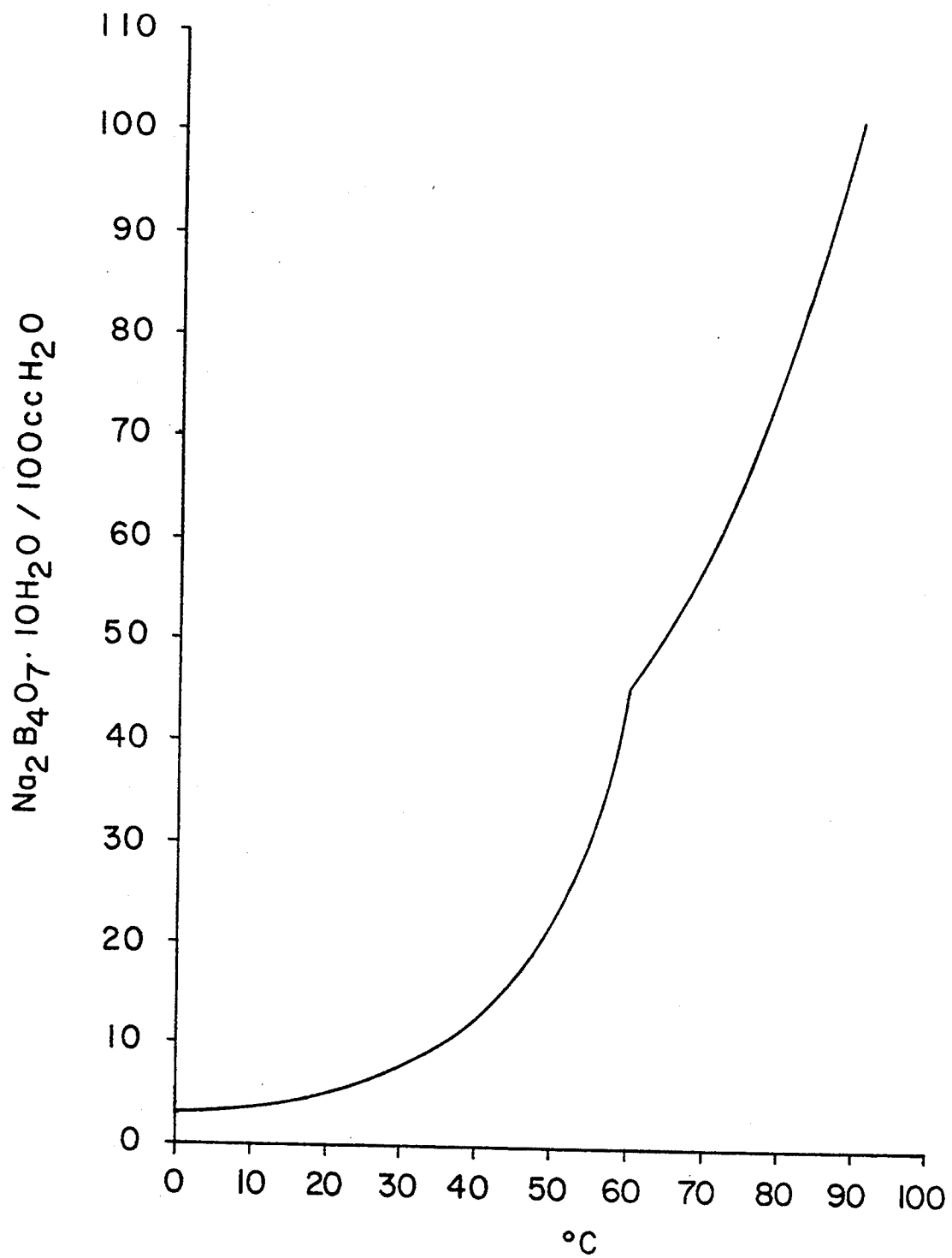
FIG. 9 is a solubility curve of saturated $Na_2B_4O_7.10H_2O$ as a function of temperature.

Solution A is prepared by dissolving 1 Kg of $Na_2B_4O_7.5H_2O$ in 1 Kg $H_2O$. The solution is prepared at a temperature of 100° C. Solution B is prepared by dissolving 40 gr. of $Na_2B_4O_7.5H_2O$ in 1.56 Kg $H_2O$ to form a 1.6 Kg solution. Solution B is prepared at a temperature of 10° C. The resulting solution of A and B thus exists at a temperature of 60° C. According to the solubility curve at FIG. 8, the new solution contains about 40.6 gr. of $Na_2B_4O_7.5H_2O$ per 100 gr. $H_2O$. The solubility of this mixture, however, at this temperature is only 31.7 gr. per 100 gr. $H_2O$. Thus, about 9 gr. of $Na_2B_4O_7.5H_2O$ will precipitate out per 100 gr. $H_2O$.

The remaining 3.370 Kg solution of the mixture of A and B, ("solution C") which has a temperature of 60° C., was then mixed with 5.06 Kg of solution B at a temperature of 10° C. This new solution ("E") contains 16.4 gr. of $Na_2B_4O_7.10H_2O$ per 100 gr. $H_2O$ and has a temperature of 30° C. At this temperature, however, the solubility of sodium borate is 7.85 gr. per 100 gr. $H_2O$. Thus, 8.55 gr. of $Na_2B_4O_7.10H_2O$ will crystallize per 100 gr. $H_2O$ in the mixture.

Solution E, was then allowed to evaporate in an open pond and cooled to a temperature of 10° C., providing more solution B required above as well as precipitating out an additional 390 gr. of $Na_2B_4O_7.10H_2O$ per 100 gr. $H_2O$.

In an additional example of the polythermic crystallization embodiment of the invention, a 2 Kg magnesium nitrate solution is prepared containing 140 gr. of $Mg(NO_3)_2$ per 100 gr. $H_2O$ at a temperature of 90° C. A separate 2 Kg solution containing 70 gr. of $Mg(NO_3)_2$ per 100 gr. $H_2O$ was prepared at a temperature of 20° C.

Figure 10:
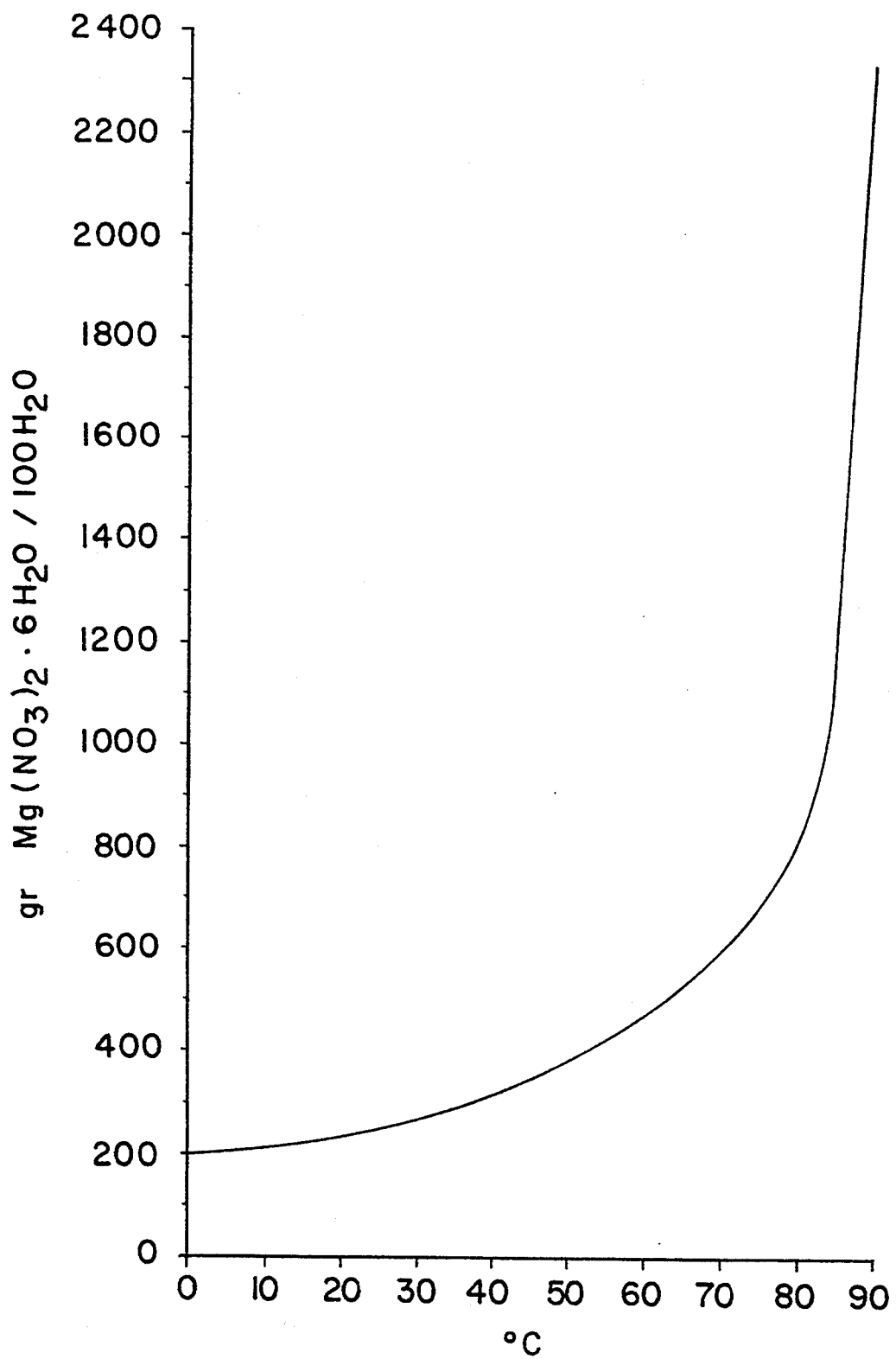
FIG. 10 is a solubility curve of saturated $Mg(NO_3)_2.6H_2O$ as a function of temperature.

The two were gradually mixed in an atmospheric crystallizer for about four hours. The recovered salt was 600 gr. of coarse $Mg(NO_3)_2.6H_2O$. (see FIG. 10 for the solubility curve).

MATERIAL BALANCE OF POLYTHERMIC CRYSTALLIZATION OF $Na_2B_4O_7.5H_2O$ and $Na_2B_4O_7.10H_2O$

| | Temp. °C. | | $H_2O$ (g) | Total (g) |
|---|---|---|---|---|
| | | $Na_2B_4O_7.5H_2O$ (g) | | |
| Solution A | 100 | 1,000 | 1,000 | 2,000 |
| Solution B | 10 | 40 | 1,560 | 1,600 |
| Solution A + B | 60 | 1,040 | 2,560 | 3,600 |
| Solution C | 60 | 810 | 2,560 | 3,370 |
| Crystallization | 60 | 230 | — | 230 |
| | | $Na_2B_4O_7.10H_2O$ (g) | | |
| Solution C | 60 | 1,060 | 2,310 | 3,370 |
| Solution B | 10 | 130 | 4,930 | 5,060 |
| Solution C + B | 30 | 1,190 | 7,240 | 8,430 |
| Solution E | 30 | 570 | 7,240 | 7,810 |
| Crystallization | — | 620 | — | 620 |
| Solution E | 30 | 570 | 7,240 | 7,810 |
| Evaporation | — | — | 410 | 410 |
| Solution | 10 | 180 | 6,830 | 7,010 |
| Crystallization | — | 390 | — | 390 |

What is claimed is:

1. A method of crystallizing an inorganic salt which comprises:
   preparing a first solution saturated with a first inorganic salt;
   preparing a second solution saturated with said first salt and containing a second, different, inorganic salt;
   wherein a plot of saturated concentrations of said first salt versus concentrations of said second salt produces a concave solubility curve;
   mixing said first and second solutions at ambient temperature and pressure to form a third solution which is supersaturated with said first salt;
   precipitating said first salt from said third solution substantially without evaporating said third solution, the precipitate being a salt of at least USP grade;
   separating said precipitate from said third solution; collecting said precipitate; and
   solar evaporating said third solution remaining after said collection for re-use as said second solution.

2. The method of claim 1 wherein the first and second solutions are mixed in an atmospheric crystallizer.

3. The method of claim 1 which further comprises selecting NaCl as said first inorganic salt.

4. The method of claim 1 which further comprises selecting KCl as said first inorganic salt.

5. The method of claim 1 which further comprises selecting $MgSO_4.H_2O$ as said first inorganic salt.

6. The method of claim 1 wherein prior to said solar evaporation, said third solution is mixed with said first solution to precipitate an additional amount of said first salt.

7. The method of claim 1 wherein said first solution contains said second inorganic salt.

8. The method of claim 1 wherein the first inorganic salt is NaCl and the second inorganic salt is $CaCl_2$.

9. The method of claim 1 wherein the first inorganic salt is KCl and the second inorganic salt is $CaCl_2$.

10. The method of claim 1 wherein the first inorganic salt is KCl and the second inorganic salt is $MgCl_2$.

11. The method of claim 1 wherein the first inorganic salt is NaCl and the second inorganic salt is $MgCl_2$.

12. The method of claim 1 wherein the first inorganic salt is $MgSO_4.H_2O$ and the second inorganic salt is $MgCl_2$.

13. A method of crystallizing an inorganic salt which comprises:
   preparing a first solution saturated with a first inorganic salt;
   preparing a second solution saturated with said first salt and containing a second, different, inorganic salt;
   wherein a plot of saturated concentrations of said first salt versus concentrations of said second salt produces a concave solubility curve;
   mixing said first and second solutions at ambient temperature and pressure to form a third solution which is supersaturated with said first salt;
   precipitating said first salt from said third solution substantially without evaporating said third solution, the precipitate being a salt of at least USP grade;
   separating said precipitate from said third solution;
   collecting said precipitate; and
   solar evaporating said third solution remaining after said collection to precipitate out residual first salt values.

* * * * *